Oct. 18, 1932.                A. A. THAYER                1,883,436
SHOCK ABSORBER
Filed July 19, 1926
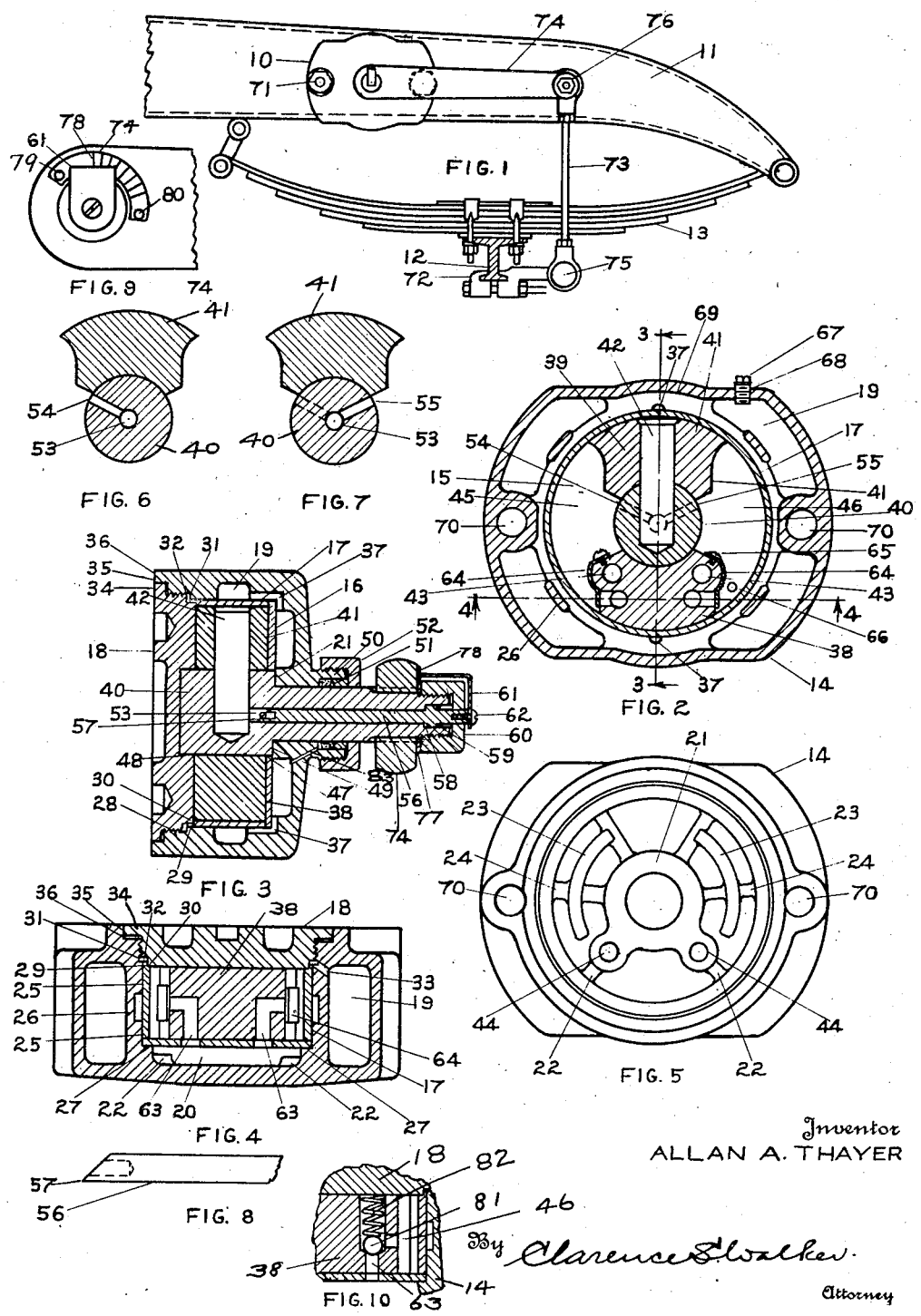
Inventor
ALLAN A. THAYER
By Clarence S. Walker
Attorney Patented Oct. 18, 1932

1,883,436

UNITED STATES PATENT OFFICE

ALLAN A. THAYER, OF JAMESTOWN, NEW YORK, ASSIGNOR TO AUTO SPRING CONTROL COMPANY, INC., OF JAMESTOWN, NEW YORK, A CORPORATION OF NEW YORK

SHOCK ABSORBER

Application filed July 19, 1926. Serial No. 123,434.

This invention relates to improvements in a shock absorber, and more particularly to a shock absorber of the hydraulic type, in which the shock is received by a liquid medium and absorbed as the medium passes through restricted openings, certain of which are provided with suitable regulating valves.

The present invention comprises an outer shell containing a single cylindrical chamber having a piston or vane pivotally mounted at the center of said chamber, which piston divides said cylindrical chamber into compartments or pockets on either side thereof, the size and capacity of which vary with the position of the piston, these pockets being filled with a suitable liquid medium which will resist the motion of the piston in either direction.

Among the objects of this invention are the following:

A. To provide a shock absorber which can be cheaply and easily manufactured, in which the walls of the chamber are formed by elements separate from the outer shell and each other and independently finished before assemblage, and when assembled, constituting a non-leakable fluid-holding chamber.

B. To provide in a shock absorber having a single compression chamber, including directly connected pockets, a manually operable valve in the connecting conduit between such pockets, whereby the passage of fluid therethrough is controlled.

C. To provide, in a shock absorber, a well or reservoir which completely surrounds the periphery of the compression chamber and is also at the front thereof, by means of which the compression chamber is kept full so long as there be any liquid in the reservoir.

D. To provide in a shock absorber of the type just described, suitable passages between the pockets thereof and also passages connecting each pocket or compartment with a well or reservoir provided between the shell and the compression chamber.

Other objects of this invention will appear from a consideration of the following description taken in connection with the drawing which forms a part thereof, and in which Fig. 1 is a side elevation of a portion of a motor vehicle equipped with one embodiment of this invention;

Fig. 2 is an enlarged transverse section of a shock absorber embodying this invention;

Fig. 3 is a vertical sectional view taken along the line 3—3 of Fig. 2;

Fig. 4 is a sectional view taken along the line 4—4 of Figure 2;

Fig. 5 is a plan view looking into the outer shell, the elements forming the compression chamber being removed;

Figs. 6 and 7 are enlarged sectional views taken through the piston illustrating the relation of the valve mechanism;

Fig. 8 is an enlarged side elevation of the inner end of the control pin;

Fig. 9 is an enlarged view of another detail of the control mechanism; and

Fig. 10 is a fragmentary view of another form of valve mechanism that can be used if desired.

Referring to the drawing, the reference numeral 10 is employed to designate a shock absorber embodying this invention mounted on the front end 11 of the frame of a motor vehicle, which frame is supported by a front axle 12, through a leaf spring 13.

The shock absorber comprises a shell or casing 14, preferably made from a casting, and in which is provided a single chamber 15 formed by a base plate 16, an annular wall 17, and a cover plate or cap 18. As will be clear from an examination of Figures 2, 3 and 4, the wall 17 and plate 16 are spaced from the outer walls of the shell 14 to provide a reservoir 19 around the periphery of the chamber and a second reservoir 20 at the outer face of the chamber.

The shell 14 is cup-shaped having at its closed end an integral central boss 21 connected to the wall of the casing by integral radial bars 22, and integral arcuate bars 23 of the same height as the boss 21 and radial bars 24. The radial bars 22 and 24 are lower than the boss 21 and the bars 23. The inner side wall of the shell is spaced from the outer wall and comprises separate parallel rings 25 joined at intervals by pillars 26.

After the casing 14 has been cast the inner faces of the side wall rings 25 are machined to provide cylindrical surface in the same plane, and the upper faces of the boss 21 and bars 23 are finished in a plane at right angles to that cylindrical surface. An annular shoulder 27 is formed at the joinder of the outer ring 25 with the closed end of the shell in the plane of the boss 21 and bars 23.

The compression chamber 15 within the shell 14 is formed by the base plate 16, which is first inserted into the shell to rest upon the face of the boss 21, and the bars 23, and upon the shoulder 25, the diameter of the disc being exactly that defined by the cylindrical surface. The annular wall 17, the outer diameter of which is the same as the interior diameter of the cylindrical surface defined by the rings 25 is next introduced, bearing upon the disc 16. The chamber 15 is now completed by the cap 18, which is exteriorly threaded to engage the threads 28 formed in the casing 14.

The outer end of the wall 17 is cut away to provide an annular shoulder 29, into which the inner end 30 of the cap 18 enters. The inner end 30 of the cap 18 is made deeper than the shoulder 27 so that when the cap is turned down to seat on the shoulder, the wall 17 is compressed against the plate 16 to seal the space between the plate and the side wall. The casing 14 is provided with an annular surface 31 spaced from the threads 28 and the depth of the end 30 is such that when the cap 18 is in its final position an annular groove or recess 32 is provided, from which a port 33 leads to the reservoir 19. The cap 18 terminates in a flange 34, which enters a cavity 35 at the mouth of the shell. In this cavity 35 may be placed a gasket 36 against which the flange 34 will rest.

The reservoir 19 extends completely around the periphery of the chamber 15, and as shown in Figure 3, is connected to the reservoir 20 at the inner end by means of passages 37, provided across the shoulder 29 at the top and bottom of the shock absorber (as shown also in Figure 2).

The chamber 15 contains a block 38 rigidly fixed in place and a piston 39. The piston 39 comprises a shaft 40 and a head 41 secured to the shaft 40 by a post 42. The outer surface of the head 41 is curved to conform exactly to the inner surface of the wall 17 and the inner surface is curved to conform to the outer surface of the shaft 40. The upper face of the block 38 is also curved to receive the shaft 40, while its lower face is curved to conform to the inner surface of the wall 17. The block 38 is rigidly fixed in the chamber by pins or bolts passed through holes 43 in the block 38 and plate 16 into depressions 44 in the boss 21.

The block 38, shaft 40 and head 41 thus extend across the chamber 15 forming two pockets 45, 46, one at each side which, as will be pointed out below, are filled with any suitable liquid. The engaging surfaces of the block 38 with the wall 17 and shaft 40, and the head 41 with the shaft 40, and the wall 17 are long, as is shown particularly in Figure 2, and hence practically eliminate any leakage of the liquid from one pocket to the other along the contacting surfaces.

Referring to Figure 3, it will be noted that the shaft 40 extends through a central opening 47 in the plate 16, and is supported at one end in a bearing 48 at the center of the inner face of the cap 18. The diameter of the shaft is reduced beyond the plate 16, thus providing shoulders 49, which rest against the boss 21. The shaft 40 passes out of the shell 14 through an integral collar 50, and the escape of any liquid around the shaft is prevented by a packing 51 held in place by a cap nut 52.

Through the center of the shaft 40 from the outer end and the post 42 is formed a passage 53, as shown in Fig. 3, which is connected with the pockets 45 and 46 by means of conduits 54 and 55, the conduits 54, 55 and the passage 53 thus forming a by-pass between the pockets.

In the passage 53 is mounted a rotatable pin 56, the inner end or tip 57 of which is inclined. (See Figure 8.) The top of the pin extends beyond the mouth of the conduit 54 and will control the flow of liquid from that conduit into the passage 53. In one position the tip 57 completely closes the conduit 54, while, when the pin is in a position 180° from the first position, the conduit 54 is entirely open. Any position of the pin 56 between these two limits will of course partly close the conduit 54. The mouth of the passage 53 is enlarged at the outer end of the shaft to receive a shoulder 58 on the pin 56. Suitable packing 59 is provided to prevent any escape of liquid through the passage 53 around the pin 56. A cap nut 60 which bears upon the packing 59, securing it rigidly in place, is threaded on the outer end of the shaft 40, holding the pin against any movement of reciprocation. An arm 61 is rigidly fixed on the outer end of the pin 56 beyond the nut 60 by a screw 62, so that the pin can be rotated to secure any desired relation of the tip 57 of the pin 56 to the conduit 54.

Each pocket 45 and 46 is connected to the reservoir 20 by means of a right angle vent 63, through the block 38 and plate 16. (See Figure 4.) Each vent 63 is normally closed by a spring plate 64 at the pocket end. The plate 64 is fixed upon the block 38 by means of screws or other fastening means 65. The pocket 46 is also directly connected to the reservoir 20 by a vent 66, which is open at all times.

In the outer wall of the casing at top thereof is formed a filling hole 67 normally closed by a plug 68. From an inspection of Fig. 2, it will be noted that the reservoir is higher at 69 than at the hole 67. Consequently it is not possible, when the casing is upright, as in Fig. 2, to fill it completely with oil, and hence a certain amount of air will be trapped in the shock absorber.

Through the shell 14 are provided holes 70 which extend slightly into the cavity 35. When the cap 18 is turned down into place the flange 34 projects over the holes 70. That portion of the flange is reamed out and hence bolts 71, which pass through the holes 70 will hold the cap 18 from shifting its position despite the vibrations to which it will be subjected when installed upon a motor vehicle.

The shock absorber 10 is mounted upon the frame 11 by means of the bolts 71 and is connected to the axle 12 by means of a clamp 72, a link 73 and an arm 74. The link 73 is pivotally secured to said clamp 72 and arm 74 by ball and socket joints 75 and 76 respectively. The arm 74 is keyed onto the shaft 40, being held thereon by the cap nut 60 and a washer 77.

A plate or dial 78 is mounted on the arm 74 or the shaft 36 behind the washer 77 and is provided with stops 79 and 80, which engage the arm 61 to limit its movement. The space on the dial between the stops 79 and 80 is divided by suitable marks, so that amount that the bypass formed by the conduits 54, 55 and passage 53 is open can be learned from the position of the arm 61 over the dial 78.

Before setting forth the operation of the shock absorber attention is called to the fact that any approach of the axle 12 to the frame 11 will, through the mechanism above described swing the piston 39 to the right in Fig. 2, thus reducing the size of the pocket 46, which movement of the piston will be opposed by the liquid in that pocket, while any movement of separation of the axle 12 and frame 11 will swing the piston 39 in the opposite direction, in opposition to the liquid in the pocket 45. The approach movement compresses the spring 13, while the separation movement is assisted by the recoil of the spring, and accordingly, for ease of understanding, the pocket 46 will hereinafter be referred to as the compression pocket and the pocket 45 will hereinafter be referred to as the recoil pocket.

The shock absorber is filled with liquid through the hole 67, the liquid passing from the reservoir 19 to the reservoir 20 and thence into the chamber 15 through the vents 63 and 66. In order to prevent the trapping of air in that chamber the piston is first swung to the left in Fig. 2 to enlarge the pocket 46, which will be filled from the reservoir 20 through the vents 63 and 66. The piston is then swung to the right to enlarge pocket 45, which is filled from the reservoir 20 through the vent 63 and from the pocket 46 through the bypass previously described. In addition certain of the liquid is forced from the pocket 46 through the vent 66 into the reservoir 20. Several oscillations of the piston will drive all the air out of the chamber 16. The reservoirs 19 and 20 are filled with liquid in the position shown in Fig. 2 and a certain amount of air is trapped in the portion 69 of the reservoir 19. Hence, when the liquid expands under high temperatures the air left in the reservoir will compress and permit such expansion without strain or damage to the shock absorber.

It will be noted that the compression pocket 46 is in direct connection with the reservoir 20 at all times through the vent 66, and that unless closed by the pin 56 the pockets 45, 46 are directly connected through the bypass which comprises the conduit 54, the passage 53 and the conduit 55. Consequently, when upon compression of the springs the piston 38 is moved to reduce the size of the compression pocket liquid will be forced from it, some through the vent 66 into the reservoir 20 and some through the bypass into the recoil pocket 45. Furthermore, since this movement of the piston will enlarge the recoil pocket 45 suction will be created therein by which liquid will be drawn in from the reservoir 20 through the vent 63 to fill the enlarged pocket. The return movement of the piston 38 will compress the liquid in the recoil pocket, which can only escape from the recoil pocket through the bypass into the compression pocket. The enlargement of the compression pocket by this movement of the piston will be filled by liquid drawn through the vents 63 and 66, as well as that flowing from the recoil pocket through the bypass.

From the above description it will appear that liquid can escape from the compression pocket 46 more freely than from the recoil pocket 45 because of the vent 66 and that the travel of liquid through the bypass, which is the only escape from the recoil pocket is regulated and controlled by the pin 56 as set by the arm 61. Any movement of approach of the frame and axle under ordinary driving conditions will thus be unchecked, but the recoil will be retarded in direct proportion to the amount that the bypass is closed by the pin 56. When, however, under abnormal conditions the frame and axle are forced to approach rapidly and suddenly the vent 66 will not permit the liquid to escape quickly enough under the compression of the piston and that movement of approach will thus be retarded and any shock that would otherwise result will be absorbed.

Thus the recoil pocket will retard any movement of separation of the frame and axle and the compression pocket will retard any sudden or severe movement of approach of the frame and axle, but will freely permit the ordinary approach movements under the usual road conditions. In other words, this shock absorber is of the two way or double acting type under severe shocks, and of the one way or single acting type under ordinary conditions or slight shocks.

Under normal conditions liquid may be forced out of the chamber past the inner end 30 of the cap 18. When this takes place, the excess liquid will enter the annular groove or recess 32 and flow back into the reservoir 19 through the port 33, instead of leaking out of the casing past the threads 28. Since the vents 63 are near the bottom of the casing it must follow that the chamber 15 will be kept filled with liquid as long as the level of the liquid in the reservoir is above these vents.

It will be apparent from the above description and from an examination of the drawing, particularly Fig. 3, that under no conditions will the vent 66 be closed, even though the piston 39 be swung to its extreme limit. Moreover, the construction of this shock absorber is such that the piston can travel through an arc of approximately 240 degrees without meeting any inmovable resistance, i. e., contacting with the block 38.

Fig. 10 illustrates another form of valve mechanism for the vents 63. In place of the spring plates 64 previously described the vents may be closed by balls 81 normally seated by springs 82 to prevent the escape of fluid from the pockets 45, 46, while permitting the entry of fluid thereto.

While one embodiment only of this invention has been shown and described, applicant is not limited thereto, since it is obvious that other embodiments can be made without departing from the spirit and scope of this invention as set forth in the following claims.

Having thus set forth my invention, what I claim as new and for which I desire protection by Letters Patent is:

1. A shock absorber comprising a cup-shaped shell, having on its inner bottom a plurality of separated projections, a base plate adapted to bear against said projections, an annular wall in said shell resting on said plate and a cap, said plate, wall and cap being finished independently and when assembled in said shell forming a chamber.

2. A shock absorber comprising a cup shaped shell, having on its inner bottom a plurality of separated projections, a base plate adapted to bear against said projections, an annular wall in said shell resting on said plate, and a cap having a positive engagement with the mouth of said shell, said plate, wall and cap when assembled in said shell forming a chamber therein.

3. A shock absorber comprising a cup shaped shell, having on its inner bottom a plurality of separated projections, a base plate adapted to bear against said projections, an annular wall in said shell resting on said plate and a cap having a positive engagement with the mouth of said shell, said plate, wall and cap when assembled in said shell forming a chamber therein, said cap by means of its engagement with said shell bearing upon said wall and forcing it against said plate to seal the joinders between said cap, wall and plate and make said chamber non-leakable.

4. A shock absorber comprising a shell, a chamber in said shell, a piston mounted in said chamber in contact with the walls thereof, a block fixed in said chamber cooperating with said piston to form two pockets in said chamber, the space between the walls of said chamber and said shell forming a reservoir, said reservoir and said pockets being filled with liquid medium, an open vent connecting one of said pockets with said reservoir, a valve controlled vent connecting each pocket with said reservoir, a bypass connecting said pockets, and means for oscillating said piston in said chamber.

5. A shock absorber comprising a shell, a chamber in said shell, a piston mounted in said chamber in contact with the walls thereof, a block fixed in said chamber cooperating with said piston to form two pockets in said chamber, the space between the walls of said chamber and said shell forming a reservoir, said reservoir and said pockets being filled with liquid medium, an open vent connecting one of said pockets with said reservoir, a valve controlled vent connecting said pockets, and means for oscillating said piston in said chamber.

6. A shock absorber comprising a shell, a chamber in said shell, a piston mounted in said chamber in contact with the walls thereof, a block fixed in said chamber co-operating with said piston to form two pockets in said chamber, the space between the walls of said chamber and said shell forming a reservoir, said reservoir and said pockets being filled with liquid medium, an open vent connecting one of said pockets with said reservoir, a valve controlled vent connecting each pocket with said reservoir, a bypass connecting said pockets, means for oscillating said piston in said chamber, and means for controlling the passage of the medium through said bypass.

7. A shock absorber comprising a shell, a cylindrical chamber in said shell and spaced in part therefrom, said space forming a reservoir, a piston mounted to oscillate in said chamber, a block fixed in said chamber and cooperating with said piston to form a compression pocket and a recoil pocket in said chamber, means for oscillating said piston in said chamber, and a vent unobstructed at all times connecting said compression pocket with said reservoir.

8. A shock absorber comprising a shell, a cylindrical chamber in said shell and spaced in part therefrom, said space forming a reservoir, a piston mounted to oscillate in said chamber, a block fixed in said chamber and cooperating with said piston to form a compression pocket and a recoil pocket in said chamber, means for oscillating said piston in said chamber, a vent unobstructed at all times, connecting said compression pocket with said reservoir, and a by-pass connecting said pockets.

9. A shock absorber comprising a shell, a cylindrical chamber in said shell and spaced in part therefrom, said space forming a reservoir, a piston mounted to oscillate in said chamber, a block fixed in said chamber and cooperating with said piston to form a compression pocket and a recoil pocket in said chamber, means for oscillating said piston in said chamber, a vent unobstructed at all times, connecting said compression pocket with said reservoir, and a bypass through said piston connecting said pockets.

10. A shock absorber comprising a shell, a cylindrical chamber in said shell and spaced in part therefrom, said space forming a reservoir, a piston mounted to oscillate in said chamber a block fixed in said chamber and cooperating with said piston to form a compression pocket and a recoil pocket in said chamber, means for oscillating said piston in said chamber, a vent unobstructed at all times connecting said compression pocket with said reservoir, a bypass connecting said pockets and a valve controlling the size of said bypass.

11. A shock absorber comprising a shell, a cylindrical chamber in said shell and spaced in part therefrom, said space forming a reservoir, a piston mounted to oscillate in said chamber, a block fixed in said chamber and cooperating with said piston to form a compression pocket and a recoil pocket in said chamber, means for oscillating said piston in said chamber, a vent unobstructed at all times, connecting said compression pocket with said reservoir, a bypass connecting said pockets and a manually adjustable valve controlling the size of said bypass.

12. A shock absorber comprising a shell, a cylindrical chamber in said shell and spaced in part therefrom, said space forming a reservoir, a piston mounted to oscillate in said chamber, a block fixed in said chamber and cooperating with said piston to form a compression pocket and a recoil pocket in said chamber, means for oscillating said piston in said chamber, a vent unobstructed at all times, connecting said compression pocket with said reservoir, a bypass through said piston connecting said pockets and a valve controlling the size of said bypass.

13. A shock absorber comprising a shell, a cylindrical chamber in said shell and spaced in part therefrom, said space forming a reservoir, a piston mounted to oscillate in said chamber, a block fixed in said chamber and cooperating with said piston to form a compression pocket and a recoil pocket in said chamber, means for oscillating said piston in said chamber, a vent unobstructed at all times, connecting said compression pocket with said reservoir, a bypass through said piston connecting said pockets and a manually adjustable valve controlling the size of said bypass.

14. A shock absorber comprising a shell, a compression chamber in said shell, a cap forming a part of said chamber and having a threaded engagement with said shell, said chamber being spaced in part at the front and side from said shell to form a reservoir, said reservoir and chamber being filled with a liquid medium, a recess in said shell in front of the engagement of said cap therewith and a vent leading from said recess to said reservoir whereby any liquid medium escaping from said chamber past said cap will enter said recess and pass therefrom through said vent to said reservoir, thereby relieving the pressure strain upon said cap.

15. A shock absorber comprising a shell, a compression chamber in said shell, a cap forming a part of said chamber and in engagement with said shell, said chamber being spaced in part at the front and side from said shell to form a reservoir, said reservoir and chamber being filled with a liquid medium, a recess in said shell in front of the engagement of said cap therewith, and a vent leading from said recess to said reservoir, whereby any liquid medium escaping from said chamber past said cap will enter said recess and pass therefrom through said vent to said reservoir, thereby relieving the pressure strain upon said cap.

16. In a shock absorber having a reservoir and a compression chamber provided with a compression pocket and a recoil pocket, said reservoir and pockets being filled with liquid, an unobstructed vent connecting said compression pocket with said reservoir.

17. In a shock absorber having a reservoir and a compression chamber provided with a compression pocket and a recoil pocket, said reservoir and pockets being filled with liquid, an unobstructed vent connecting said compression pocket with said reservoir, a bypass connecting said pockets and means for controlling the passage of liquid through said bypass, two vents, one leading from each pocket to said reservoir and valve mechanism preventing the passage of the liquid from said pockets through said last named vent, while permitting the passage of liquid from said reservoir.

18. In a shock absorber comprising a shell having a cylindrical chamber therein, an open ended annular wall in said chamber, a removable base plate engaged with and closing one end of said wall, and a cap removably engaged with said shell, said cap being adapted to close the other end of said wall whereby to provide a fluid tight compartment in said chamber.

19. In a shock absorber comprising a shell having a chamber therein, an open ended annular wall in said chamber, a removable base plate engaged with and closing one end of said wall, and adjustable means closing the other end of said wall, said means causing said wall to closely engage said plate whereby to provide a fluid tight compartment in said chamber.

In testimony whereof I have affixed my signature.

ALLAN A. THAYER.